(12) United States Patent
Challener et al.

(10) Patent No.: US 7,096,496 B1
(45) Date of Patent: Aug. 22, 2006

(54) METHOD AND SYSTEM FOR IMPROVED COMPUTER SECURITY UTILIZING DYNAMICALLY VARIABLE SECURITY PROFILE

(75) Inventors: David Carroll Challener, Raleigh, NC (US); Richard Alan Dayan, Wake Forest, NC (US); Palmer Eugene Newman, Apex, NC (US)

(73) Assignee: Lenovo (Singapore) Pte. Ltd., (SG)

( * ) Notice: Subject to any disclaimer, the term of this patent is extended or adjusted under 35 U.S.C. 154(b) by 0 days.

(21) Appl. No.: 09/454,646

(22) Filed: Dec. 6, 1999

(51) Int. Cl.
*G06F 21/20* (2006.01)
*G06F 15/177* (2006.01)

(52) U.S. Cl. ............... 726/17; 726/16; 726/21; 713/2; 713/100; 713/182; 713/183

(58) Field of Classification Search ............. 713/164, 713/184, 194, 200, 201, 202, 2, 100; 726/16, 726/17, 21
See application file for complete search history.

(56) References Cited

U.S. PATENT DOCUMENTS

| | | | | |
|---|---|---|---|---|
| 4,959,860 A | * | 9/1990 | Watters et al. ............. | 713/202 |
| 5,265,163 A | * | 11/1993 | Golding et al. ............ | 713/202 |
| 5,375,243 A | * | 12/1994 | Parzych et al. ............ | 713/202 |
| 5,537,544 A | * | 7/1996 | Morisawa et al. .......... | 713/202 |
| 5,606,615 A | * | 2/1997 | Lapointe et al. ........... | 713/185 |
| 5,912,621 A | * | 6/1999 | Schmidt ..................... | 340/571 |
| 6,289,456 B1 | * | 9/2001 | Kuo et al. .................. | 713/200 |
| 6,357,007 B1 | * | 3/2002 | Cromer et al. ............. | 713/194 |
| 6,397,337 B1 | * | 5/2002 | Garrett et al. ............. | 713/202 |

OTHER PUBLICATIONS

Frisch, AEleen; Essential System Administration, O'Reilly, 2$^{nd}$ Edition, pp. 5-11, 23-43, 84-95, 143-191, 381-389, 243-272; Dec. 1995.*
Frisch, AEleen; 'Linux Systems Administration: Maximizing System Security, Part 1', Linux Journal, Specialize Systems Consultants, Inc. Jan. 1996. Retrieved from: ACM Portal.*
Frisch, AEleen; 'Linux Systems Administration: Maximizing System Security, Part 2', Linux Journal, Specialize Systems Consultants, Inc. Jan. 1996. Retrieved from: ACM Portal.*
Morgan, Andrew G.; 'Pluggable Authentication Modules for Linux', Linux Journal, Specialize Systems Consultants, Inc. Jan. 1997. Retrieved from: ACM Portal.*

(Continued)

*Primary Examiner*—Gilberto Barron, Jr.
*Assistant Examiner*—Jung Kim
(74) *Attorney, Agent, or Firm*—Carlos Munoz-Bustamante; Dillon & Yudell LLP

(57) ABSTRACT

A system and method of providing increased security of a personal computer through the use of its operating system and initialization. The invention provides a security profile which indicates the level of authorization which the user has and the security exposure which a user will be permitted, which combines with a stored log of attempts to access the personal computer through the use of the password and the results of each attempt to provide a system where unsuccessful attempts will turn off the system. The system also includes a plurality of access levels so that some functions in the computer may be denied to a user but permitted to a system administrator. The access log also may include a record of physical security attacks or attempt, such as removing the covers of a personal computer. The system and method of the present invention have the advantage that, as a result of maintaining information on access attempt and other security information, a security profile may be established and criteria imposed on the user which will improve the security of the personal computer.

10 Claims, 4 Drawing Sheets

SECURITY PROFILE 70

| OFFSET | LENGTH | VALUE | DESCRIPTION | |
|---|---|---|---|---|
| 0h | 1n | 0-1 | TAMPER EVIDENT FIELD | 72 |
| 1h | 3n | 000-111 | UNSUCCESSFUL ATTEMPTS | 74 |
| 4h | 2n | 00-11 | LEVEL OF ACCESS | 76 |
| 6h | 2n | 00-11 | NETWORK PRIVILEGES | 77 |
| 8h | 5n | varies | RESERVED | 78 |
| Fh | 1n | 0-1 | EXTENSION INDICATOR | 80 |

OTHER PUBLICATIONS

Frisch, AEleen; Essential System Administration; Dec. 1995; Oreilly; 2nd Edition; pp. 1-4, 96-140.*

Frisch, AEleen; Essential System Administration; Dec. 1995; Oreilly; $2^{nd}$ Edition; Chapter 6.*

* cited by examiner

SECURITY PROFILE 70

| OFFSET | LENGTH | VALUE   | DESCRIPTION          |
|--------|--------|---------|----------------------|
| 0h     | 1n     | 0-1     | TAMPER EVIDENT FIELD |
| 1h     | 3n     | 000-111 | UNSUCCESSFUL ATTEMPTS |
| 4h     | 2n     | 00-11   | LEVEL OF ACCESS      |
| 6h     | 2n     | 00-11   | NETWORK PRIVILEGES   |
| 8h     | 5n     | varies  | RESERVED             |
| Fh     | 1n     | 0-1     | EXTENSION INDICATOR  |

FIG. 4

METHOD AND SYSTEM FOR IMPROVED COMPUTER SECURITY UTILIZING DYNAMICALLY VARIABLE SECURITY PROFILE

BACKGROUND OF THE INVENTION

1. Field of the Invention

The present invention is an improved system and method for providing system security in a computer. More particularly, the present invention relates to improved security provided by the operating system of a personal computer.

2. Background Art

Security, particularly data security, is an essential aspect of any computer and its operating system. It is desirable to make data and programs stored on a computer system available to authorized users with a minimum of effort by (and delay to) an authorized user with minimum overhead to the computer while preferably denying access to the programs and data to those who are not authorized to use the data and programs (or at least delaying substantially and requiring much time and trouble).

It is well known to have a "power-on" password on a computer system. Such a system allows an authorized user to identify himself as an authorized user by his entry of the power-on password, then access the data and the programs stored on the computer.

It is also well known, particularly in large computer systems and in networks, to have different levels of security provided by password control. That is, a first user (or group of users) might have one level of authorization to perform some functions with the computer or the network and to be denied performing other functions, with a second user (or group of users) with a higher authorization being permitted to perform those functions the first user was denied. For example, in a grocery store, a cashier may be able to process sales transactions but not "credit" transactions (or credit transactions above a threshold), which may require a manager's authorization). As a second example of differing levels of authorization, in a mainframe computer, the password of the system administrator must be employed to add a new user to the list of authorized users, a function which an authorized user would not be permitted to perform.

But a personal computer might be subject to a variety of attacks, ranging from a physical attack (an attempt to get into the hardware by removing a cover or other enclosure) to repeated entry of different passwords to try to find the right password (a process which has been called "hammering" in the trade). Many of the present day personal computers have some form of security, perhaps a power-on password. These systems lack a log of the access attempts and the results thereof, allowing someone to try repeatedly different passwords until the valid password is determined. Some systems have a system which locks up after several failures to enter the proper password, but these systems then allow the computer to be powered down and powered back up for repeated efforts to find the right password. This system of having to power the computer down and back up may slow down the process of breaking into the computer but it does not prevent it.

Although it might be assumed that a personal computer bears a greater risk of security breaches at some times rather than others (for example, at night or on a weekend in an office environment, the security risk is greater because fewer people are present), the present security systems for personal computers do not take into account that the risk of security attempt differs by the day and time.

The Operating System Patent discloses the functions of an operating system and suggests some limited forms of security for the personal computer. Other personal computers on the market include some forms of security, sometimes quite limited such as a key lock, while others rely on a power-on password.

Accordingly, the current systems for providing computer security, particularly in a personal computer system, have undesirable limitations and disadvantages.

SUMMARY OF THE INVENTION

The present invention has the advantage that it is simple but effective method of providing improved security in a personal computer through the use of the operating system to control security modes in a personal computer. Different passwords for different authorization levels and improved security through the use of algorithms stored in the personal computer through the operating system provide increased levels of security while allowing the functions a permitted user enjoys to be performed with a minimum of overhead and trouble.

The present invention also maintains a log of the attempt to access the personal computer and the results of those attempts, so that access may be terminated when a predetermined threshold of unsuccessful password attempts has been reached. The log can be queried to determine whether suspicious patterns of activity have been encountered and, based on the log of successful password attempts, it may be able to determine whether the security of the personal computer (particularly it data and programs) has been breached.

It is thus an object of the present invention to provide increased security for a personal computer. The present invention allows the operating system to set up levels of security through the use of the operating system to provide various levels of authorization for any particular user of the computer. Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Figure 1:
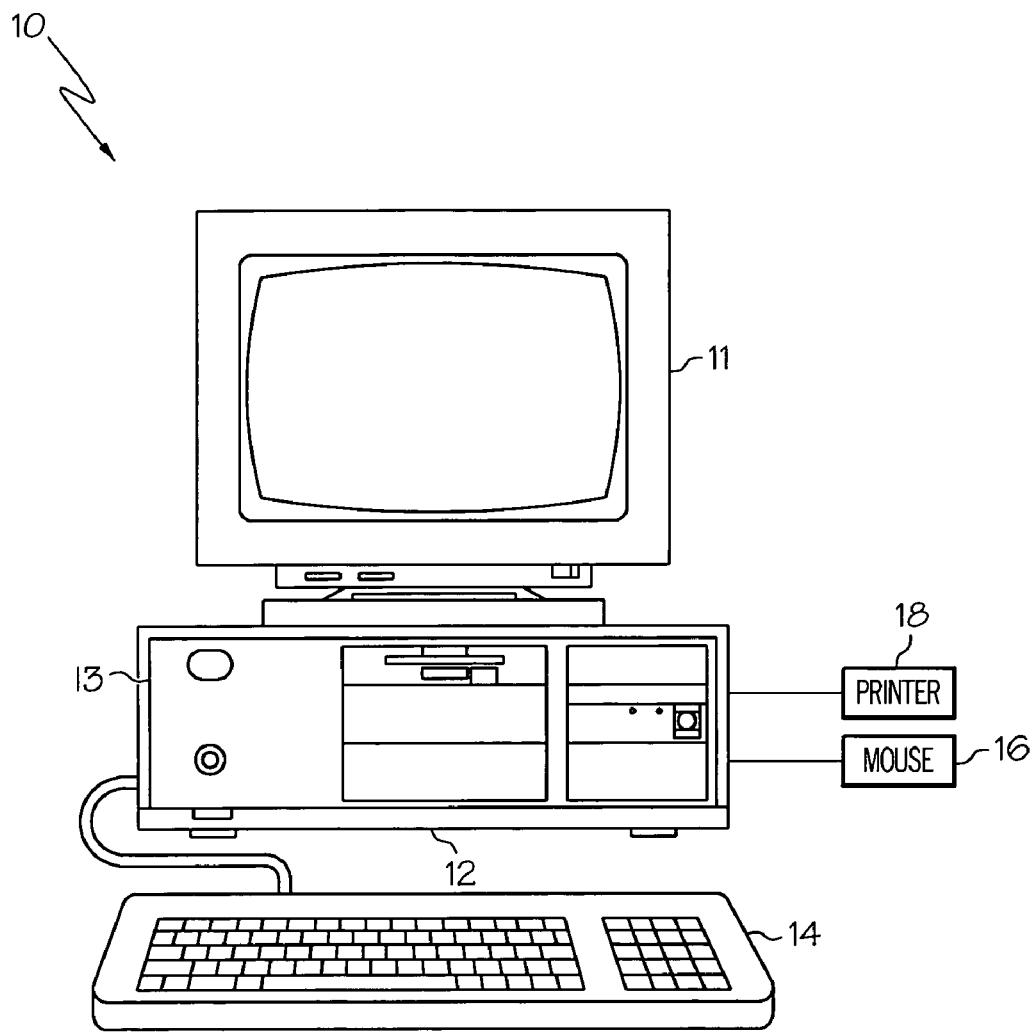
Figure 2:
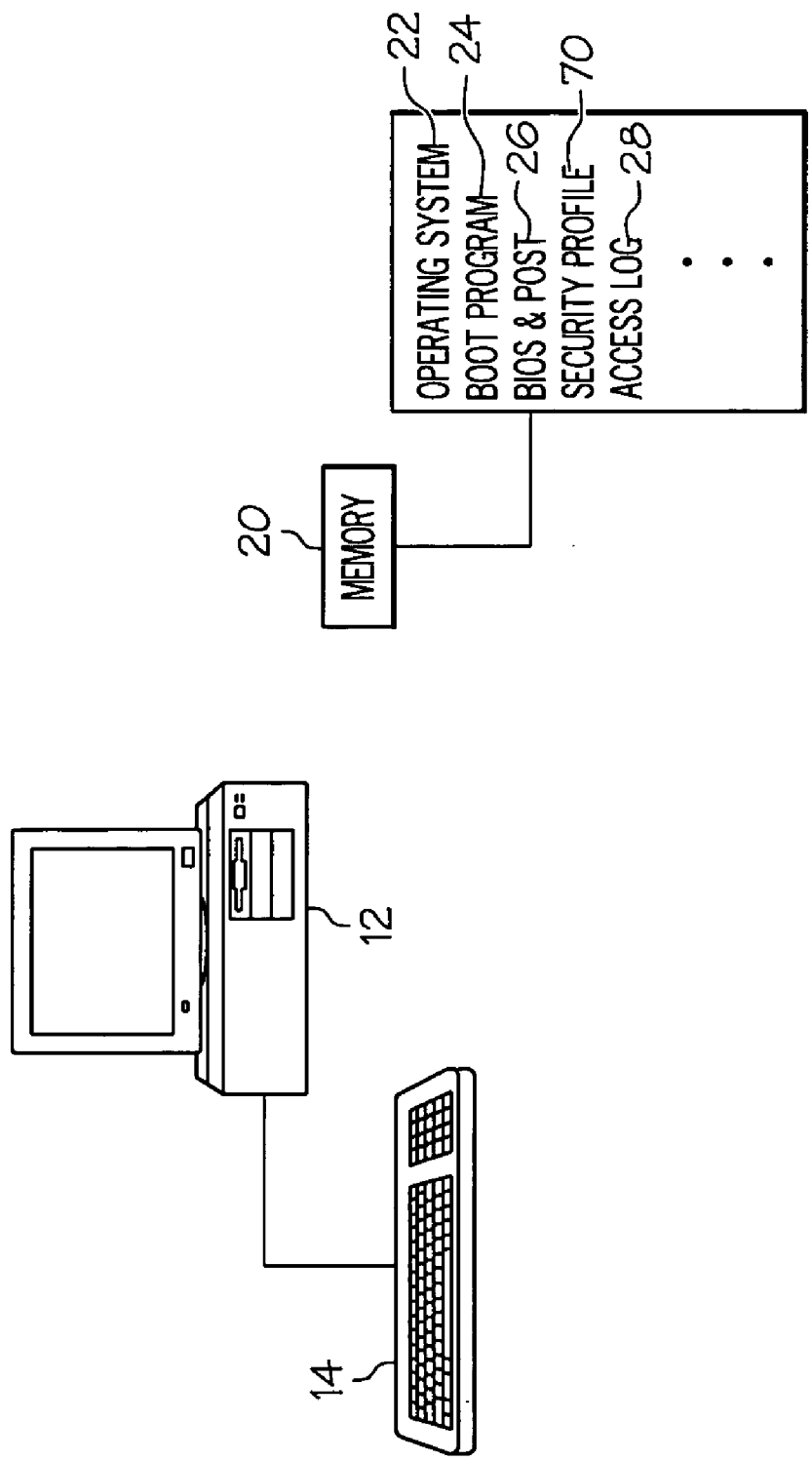
Figure 3:
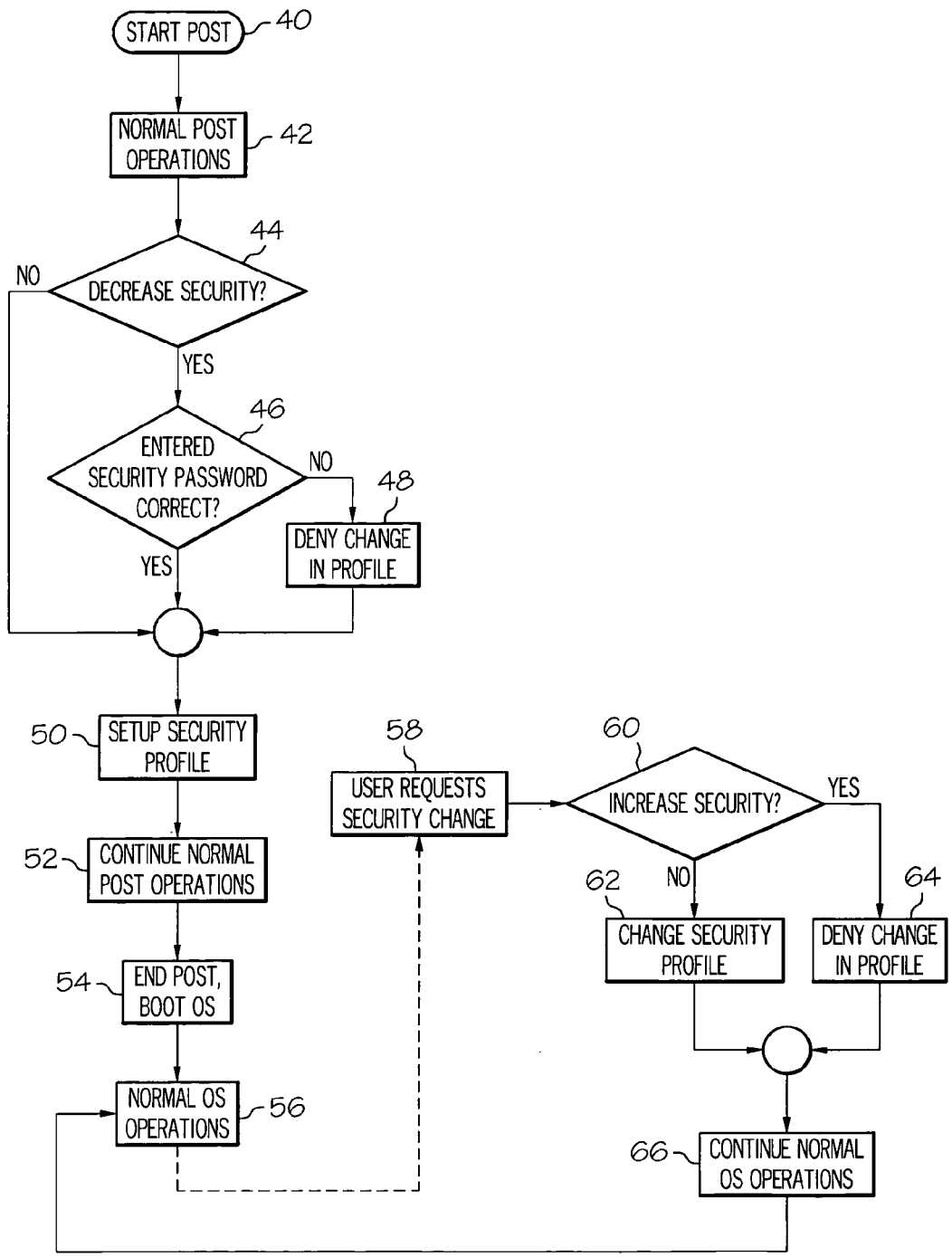

Having thus described some of the objects and advantages of the present invention, others will be made apparent to those skilled in the art in view of the following drawings taken together with the description in which the present invention of an improved security system and method is shown in which:

FIG. 1 is a pictorial view of a personal computer environment of the present invention;

FIG. 2 is a block diagram of certain components of the personal computer of FIG. 1;

FIG. 3 is a flow chart of the security system of the present invention; and

FIG. 4 is an illustration of a security profile stored in the personal computer and useful in practicing aspects of the present invention.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures. It will also be recognized that some of the advantages of the present invention will be available through the use of certain features, but that other features may be omitted or changed without losing the benefits of the present invention.

Before describing the preferred embodiment of the present invention in detail, it is advisable to provide definitions of certain terms which are useful in understanding the present invention:

The System Owner is the user who is responsible for the configuring and placing the system in the secured mode initially. The System Owner will control configuration both initially and whenever an update needs to be made. The System Owner will control the Security Password and be responsible for maintaining its integrity. The System Owner will maintain physical security of a tamper-evident cover key lock. The System Owner will be responsible for maintaining security logs on all systems. The System Owner will also have to maintain a record of all attempted security breaches. The System Owner may own more than one system. The System Owner is considered an authorized user and can also be considered a normal user.

Software Security Owner is the administrator who is responsible for the Software on a system. As many of the security features in the present system will be controlled by the operating system, it is necessary to have a super-user administrator with the ability to control access to the software available to the system. The Software Security Owner must work with the System Owner, and, in many cases, will be the same as the System Owner.

Authorized User is any user who is given permission to use the Security Password. This may or may not be the System Owner. The Authorized User may have a key for a particular system or set of systems. If this person is responsible for recovering a system from a security breach, this person must report it to the System Owner.

Normal User is a user who is permitted to use some of the features of the System. A Normal User may change the configuration of the system to a more secure state from a less secure state (such as permitting fewer access attempts before requiring the system to close down), but is not permitted to fix a problem or to make a system less secure from a more secure state (activities which require the System Owner or Network System Security Owner). The Normal User does not have the Security Password or the cover key and is not permitted to make configuration changes to the System.

Unauthorized User is anyone who is not a System Owner, an Authorized User, a Network System Security Owner or an Authorized User for the particular system. Any use of the system by an Unauthorized User (other than an unsuccessful power-on password attempt) is considered a security breach and must be trackable.

Trusted Kernel is a software module which is assumed to be able to provide an operating system with appropriate levels of security preserved throughout its operation. That is, a normal user would be limited to performing the functions of a normal user but would not be able to assume the role of a Software Security Owner without authorization. Various forms of trusted kernels are in use in operating systems such as IBM's OS/400 operating system, Microsoft's Windows NT and various forms of UNIX operating system.

Since the System Owner may set up the system to allow network access and remote administration of the security, the Network System Security Owner administers the security of the system remotely. This is less secure than having all the security of the system being done locally, but it may be sufficient security for some environments.

Levels of Security are those levels of permission which have been established to control access to data and functions of a computer. The levels may be set to the preferences of the System Owner through the use of the software and the Trusted Kernel, but for illustrating the present invention, a system with 5 levels of security is useful for consideration. The highest level of security, Level 0, is the level at which the System Owner operates. The System Owner has access to the entire computer system, including its hardware and software and the hardware security and can assign levels of security to others. He can turn on and off the Network System Security and assign authorized users and their level of security. Level 1 Security is that of the Network System Security, a privilege which includes all of the powers of Level 0 except that this person cannot establish his own privilege, although he can delete it. Level 2 Security is the level at which the Software Security Owner operates with the ability to control users and passwords and assign system resources to various users. In Level 2 security also involves as much of the rights of the System Owner and the Network System Security as they choose to delegate. Level 3 security is the level a Normal User operates at. His privilege is normally restricted to using those files and system resources that a super-user (one with a higher level of security) permits him to operate. Level 4 security is the lowest level of privilege and is essentially none.

FIG. 1 is a pictorial view of a personal computer 10 useful in practicing the present invention. The personal computer 10 includes a display 11 coupled to a system unit 12, with a keyboard 14 attached to the system unit 12. Additionally shown in this FIG. 1, although optional in face, are a mouse 16 for user input and a printer 18 for providing printed output from the personal computer 10. Not shown in this Figure, but well known in the art, the personal computer 10 may be connected, either through some standard attachment or through a modem, to a network and may include a variety of temporary and permanent memory and storage in the form of random access memory (RAM), read only memory (ROM) and disk storage, either in the form of one or more hard drives or one or more drives with removable media such as CD-ROMS's and floppy diskettes. The data and programs stored in a personal computer have value to the other and to others who want to have access to the data (and sometimes to a lesser extent, the programs), and it is to reduce the likelihood of access to such programs and data that the present invention is addressed. The system unit 12 includes 13 which surround the storage and processor, covers which may be secured against tampering by a key lock and/or tamper indicating circuitry.

FIG. 2 is a block diagram of portions of the personal computer 10 shown in FIG. 1 and which forms the environment of the present invention. The personal computer 10 includes the keyboard 14 coupled to the system unit 12 which contains memory or storage 20. The memory 20 which may be composed of several different memory technologies, includes storage for an operating system 22 which, in its preferred embodiment, includes a boot program 24 and a power-on-self-test program 26. Storage for a security profile 70 which is created, stored and updated as will be described later, particularly in connection with FIG. 4 is stored in Flash memory along with BIOS and POST 26 and is locked when BIOS and POST are not executing. The memory 20 also includes a log 28 listing the access attempts for the personal computer 10 and results of each access attempt so that the system can be audited and that a record of failed access attempts will indicate that the system has been under attack.

A system in its most secure state when access is only granted to a level 0 person. A system is in its least secure state when access is granted to a level 4 person.

FIG. 3 is a flow chart illustrating the process of the present invention, which begins at block 40, illustrating the start of the Power-On-System-Test (POST). Thereafter, the process passes to block 42 which illustrates normal POST operations. Next, the process passes to block 44, which depicts a determination of whether or not an attempt has been made to decrease security. If so, the process passes to block 46 which depicts a determination of whether or not the proper security password has been entered. If the proper security password has not been entered, the process passes to block 48. Block 48 illustrates a denial of the attempted change in the security profile.

Referring again to block 44, in the event no attempt has been made to decrease security, or, referring to block 46, in the event an attempt to decrease security has been made and the entered security password was correct or, the entrance security password was incorrect and the security profile change was denied, the process passes to block 50. Block 50 illustrates the setting up of the security profile.

Next, the process passes to block 52, which illustrates the continuing of normal POST operations. Block 54 depicts the ending of POST operations and the booting of the operating system. Thereafter, block 56 depicts normal operating system operations.

Block 58 of the flow chart of FIG. 3 illustrates a user requesting a security change and the process then passes to block 60. Block 60 depicts a determination of whether the user desires to increase security, and if so, the process passes to block 64, which illustrates a denial of the change in profile. If not, the process passes to block 62, which depicts a change in the security profile. Thereafter, the process passes to block 66, which illustrates a continuation of normal operating system operations.

Thus, during the power-on-self-test, the security profile can be written and read as desired, but after POST is completed, a normal user can only write ones into the security profile. Thus, the memory is all ones in its most secure state and all 0's when it is in its least secure states. This has the advantage that, should power be lost the personal computer for long enough to drain the power, the system will default to all ones or its most secure state. Of course, the security profile can be updated (e.g., by the System Owner) using his privilege password (e.g. the PAP or PA) to make the security profile less secure, if desired. Since some of the fields (such as the tamper evident field) may be programmed to shut the personal computer down to normal users, it would be essential that there be a mechanism available to someone to reverse such fields, but this is a privilege of a super-user or system owner and not permitted to a normal user. Because, if a normal user attempted unsuccessfully to give himself the rights of a System Owner, for example, or other privilege, he would like to erase any record of such attempt, while the System Owner would certainly wish to preserve an indication of such unauthorized activity.

FIG. 3 is a flow chart illustrating the process of the present invention. During the power-on-self-test, the security profile can be written and read as desired, but after POST is completed, a normal user can only write ones into the security profile. Thus, the memory is all ones in its most secure state and all zeros when it is in its least secure state. This has the advantage that, should power be lost to the personal computer for long enough to drain the power, the system will default to all ones or its most secure state. Of course, the security profile can be updated (e.g., by the System Owner) using his privilege password (e.g., the PAP or PA) to make the security profile less secure, if desired. Since some of the fields (such as the tamper evident field) may be programmed to shut the personal computer down to normal users, it would be essential that there be a mechanism available to someone to reverse such fields, but this is a privilege of a super-user or system owner and not permitted to a normal user. Because, if a normal user attempted unsuccessfully to give himself the rights of a System Owner, for example, or other privilege, he would like to erase any record of such attempt, while the System Owner would certainly wish to preserve an indication of such unauthorized activity.

FIG. 4 illustrates a security profile of the type which is generated, stored and updated as a result of the improved security processes of the present invention. A security profile 70 includes a plurality of fields, each of which either indicates a level of authorization for the individual or a level of security risk. The security profile 70 is stored in the memory of the personal computer, and an authorized user is permitted to adjust the security profile to a more secure state from a less secure state, but only someone with the security password (e.g., the System Owner or the Software System Owner) can adjust the security profile from a more secure state to a less secure state. That is, the operating system will allow the status of the configuration to be changed only if it is in a non-secure state or if the security password is entered.

In the present system, it is envisioned that a more secure state will be assigned to a binary 1 and a less secure state will be assigned to a binary 0, and a field can be changed from 0 to 1 as a result of a user request. Obviously, the choice of which binary state represents greater security and which represents less security is one of design choice and not an integral part of this invention, although the choice of one as the more secure state does have an advantage which will be discussed elsewhere in this document. A Security Password, such as a Privilege Access Password (PAP) or an Administrator Password (AP), is required to change a 1 (a more secure state) into a less secure state 0 in the security profile 70 stored in the memory of the personal computer 10.

The security profile 70 which is envisioned to include some six bytes in its preferred embodiment, but which can be expanded or contracted as appropriate for the situation) includes a first field of one bit which is a tamper evident field 72. This field requires the correct Privilege Access Password to reset. This field will be set if a physical security breach is detected, as in the opening of covers of the system unit 12. It may also be set by an operating system API, by a tamper switch in the mechanical locking mechanism of the cover, or by either the presence or the absence of a signal, such as a radio signal. Such a signal might indicate that a personal computer has been improperly removed from a network.

The second field 74 of the security profile 70 is a field which indicates then number of unsuccessful attempts at entering the user password that would be permitted before the system is shut down. In this example, 000 would equal 7, 001 would equal 6, 010 would equal 5, 011 would equal 4, 100 would equal 3, 101 would equal 2, 110 would equal 1 and 111 would equal 0. The user would be permitted to attempt the number of permitted unsuccessful attempts plus one, to allow for a successful attempt at the end. This field could be set by an operating system API (for example, to take into account a greater security exposure during certain time periods, like late evening or on certain days, like weekends).

A next field 76 of the security profile 70 is a level of access field. This could be used to determine if a user will be permitted to use functions like receiving data over IP. This could be used to indicate the level of data which could be received (like X,R,PG, etc.) or like military classifications of unclassified, confidential, secret, top secret, code word, etc. An end user could reduce the level of secure traffic which he can use, but not to increase it without the privilege from the Security Password.

Following the field 76 in the security profile 70 is a two bit field which would allow for network privileges for privilege or super-user privilege fields. These may be turned from 0 to 1 by either an operating system API (for weekend or after hours, for example), or because too many unsuccessful attempts had been made).

Field 78 allows five bits for expansion of the security and authorization system to include additional function or privilege to be added at a later date. Field 80 is bit 17 and is used to signal that a following four bits refer to a memory location where extension fields will be located.

Of course, many modifications of the present invention will be apparent to those skilled in the relevant art in view of the foregoing description of the preferred embodiment, taken together with the accompanying drawings. For example, the content and positioning of data within a security profile are arbitrary and subject to change if desired. The algorithms and rationale as well as the security indicators described in connection with assessing the security risk of the system and the levels of security can be adjusted to suit the perceived risk to the System Owner. Additionally, the "1" and "0" of the security profile could be reverse without departing from the spirit of the present invention. Further, it is possible to derive some of the benefits of the present invention through the selective use of features of the present security system without the corresponding use of other features. Accordingly, the foregoing description of the preferred embodiment should be considered as merely illustrative of the principles of the

What is claimed is:

1. A system for establishing a level of security in a personal computer having a memory and a stored operating system, the system comprising:
    a variable security profile generated automatically when the system is turned on, said variable security profile specifying:
        a variable number of unsuccessful power-on password attempts permitted based upon at least one other factor chosen from time of day and day of week; and,
        a security level of authorization of the user; and
    allowing or denying use of the personal computer to the user based on the security profile.

2. A system for providing security in a personal computer including the elements of claim 1 wherein the security profile includes a log of the access attempts for the personal computer and the results of each attempt.

3. A system of the type described in claim 2 wherein the variable security profile can be altered to a less secure state only by a system owner through the use of a password different than the password of the user.

4. A system of the type described in claim 3 for improving security of a personal computer wherein the variable security profile can be altered to a more secure state by a normal user.

5. A system for providing computer security including the elements set fort in claim 4 where the variable security profile includes a plurality of binary indicators have a more secure state and a less secure state, and a normal user of the computer system may change at least one of the binary indicators from a less secure state to a more secure state.

6. A system for providing computer security including the elements set forth in claim 5 wherein a user with a security password may change at least one of the binary indicators from a more secure state to a less secure state.

7. A method for providing improved security in a personal computer having an operating system and a security profile stored in memory, the steps of the method comprising:
    automatically generating a variable security profile with indications of greater or lesser security when the personal computer is turned on, wherein the variable security profile specifies:
        a variable number of unsuccessful power-on password attempts permitted based upon at least one other factor chosen from time of day and day of week; and,
        a security level of authorization of the user;
    storing the variable security profile in the personal computer;
    using the variable security profile to determine what access, if any, a normal user will be permitted to have to the computer system; and
    allowing the normal user to change the variable security profile from a level of lesser security to a level of greater security but denying the normal user permission to change the variable security profile from a level of greater security to a level of lesser security.

8. A method for providing security in a personal computer including the steps of claim 7 and further including the step of allowing a privileged user with a security password to change the variable security profile from a level of greater security to a level of lesser security.

9. A method of providing security in a personal computer including the steps of claim 8 and further including the steps of updating the variable security profile in response to a security risk.

10. A method of providing security in a personal computer including the steps of claim 9 and further including the step of responding to an attempt to open a cover of the personal computer and indicating the security risk associated with the attempt to open the cover in the variable security profile.

* * * * *